(12) United States Patent
Camus et al.

(10) Patent No.: US 12,121,796 B2
(45) Date of Patent: Oct. 22, 2024

(54) SYSTEM FOR OPTICALLY SCANNING AND DETERMINING A VEHICLE TO CORRESPOND TO A VEHICLE AVAILABLE IN AN ONLINE GAMING PLATFORM

(71) Applicants: Shane Camus, Parkland, FL (US); Pablo Camus, Davie, FL (US)

(72) Inventors: Shane Camus, Parkland, FL (US); Pablo Camus, Davie, FL (US)

( * ) Notice: Subject to any disclaimer, the term of this patent is extended or adjusted under 35 U.S.C. 154(b) by 33 days.

(21) Appl. No.: 17/673,977

(22) Filed: Feb. 17, 2022

(65) Prior Publication Data
US 2023/0256326 A1    Aug. 17, 2023
US 2024/0226714 A9    Jul. 11, 2024

Related U.S. Application Data

(63) Continuation-in-part of application No. 16/779,023, filed on Jan. 31, 2020, now abandoned.

(51) Int. Cl.
| A63F 13/65  | (2014.01) |
| A63F 13/213 | (2014.01) |
| A63F 13/216 | (2014.01) |
| A63F 13/63  | (2014.01) |
| A63F 13/803 | (2014.01) |
| A63F 13/87  | (2014.01) |
| G06V 10/764 | (2022.01) |

(52) U.S. Cl.
CPC .......... *A63F 13/213* (2014.09); *A63F 13/216* (2014.09); *A63F 13/63* (2014.09); *A63F 13/65* (2014.09); *A63F 13/803* (2014.09); *A63F 13/87* (2014.09); *G06V 10/764* (2022.01); *A63F 2300/8082* (2013.01); *G06V 2201/08* (2022.01)

(58) Field of Classification Search
CPC ...... A63F 13/213; A63F 13/216; A63F 13/63; A63F 13/65; A63F 13/803; A63F 13/87; A63F 2300/8082; G06V 10/764; G06V 2201/08
See application file for complete search history.

(56) References Cited

U.S. PATENT DOCUMENTS

| 2005/0277455 A1* | 12/2005 | Chudley  | A63F 13/12 |
|                  |         |          | 463/6      |
| 2013/0162639 A1* | 6/2013  | Muench   | A63F 13/655 |
|                  |         |          | 345/419    |
| 2021/0236937 A1* | 8/2021  | Camus    | A63F 13/87 |

OTHER PUBLICATIONS https://ubisofts-the-crew.fandom.com/wiki/The_Crew:_Customization?oldid=5640, Jun. 25, 2017 (Year: 2017).*

(Continued)

*Primary Examiner* — David L Lewis
*Assistant Examiner* — Shauna-Kay Hall
(74) *Attorney, Agent, or Firm* — The Keys Law Firm, PLLC

(57) ABSTRACT

A system and method for determining a vehicle and associating the vehicle with a gaming platform comprising a computing device having a camera to capture image data of a vehicle. An optical recognition module and/or a classification module are/is configured to receive the image data of the vehicle, determine a plurality of vehicle specifications, classify the image data and/or the vehicle specifications, and associate the plurality of vehicle specifications with a virtual vehicle on a gaming platform provided by a gaming module. The system and method permit a plurality of users to compete via racing the virtual vehicles.

16 Claims, 10 Drawing Sheets

(56) References Cited

OTHER PUBLICATIONS https://play.google.com/store/apps/details?id=digital.donkraft.streetcars&hl=en_US&gl=US (Year: 2018).*
https://web.archive.org/web/20210623214747/https://www.levelupgarage.com (Year: 2021).*
https://www.cnet.com/roadshow/news/just-how-tough-is-it-to-get-a-car-scanned-into-forza/ 1/ (Year: 2016).*
NPL Google and Google Patents Search History (Year: 2023).*

\* cited by examiner

SYSTEM FOR OPTICALLY SCANNING AND DETERMINING A VEHICLE TO CORRESPOND TO A VEHICLE AVAILABLE IN AN ONLINE GAMING PLATFORM

CROSS-REFERENCE TO OTHER APPLICATIONS

This application is a Continuation-In-Part and claims the benefit of co-pending Non-Provisional application Ser. No. 16/779,023, filed on Jan. 31, 2020, incorporated herein by reference in its entirety.

TECHNICAL FIELD

The embodiments generally relate to mobile gaming systems and, more specifically, relate to optically scanning objects and engaging with the scanned object in a mobile gaming system.

BACKGROUND

Modern mobile devices incorporate a variety of technologies to provide the user with a vast array of capabilities. For example, many smartphones include a camera feature, which allows the user to capture digital images of their environment.

Smartphones can also be used as a network-connected gaming console. In recent years, many mobile applications and gaming applications have tried to encourage the physical activity of their users. Moreover, some gaming applications integrate a GPS and the camera feature of the smartphone, providing a more difficult and interactive gaming experience than is seen in traditional gaming consoles. Users can now move about an environment and engage with multiple smartphone technologies while competing with other users in the network.

One example of the above is seen in the PokémonGo game provided on mobile devices in which users move through their environment to participate in the game. The users visualize the environment through the camera on the smartphone to interact with gaming artifacts in an augmented reality platform.

Smartphone cameras can also be used to capture an image and transfer the image, using specialized software, to an object recognition module to determine an identity of the object. In the current arts, no such system exists wherein a system is configured to promote communication and competition between users in the network.

SUMMARY OF THE INVENTION

This summary is provided to introduce a variety of concepts in a simplified form that is further disclosed in the detailed description of the invention. This summary is not intended to identify key or essential inventive concepts of the claimed subject matter, nor is it intended for determining the scope of the claimed subject matter.

The embodiments presented herein provide a system for determining a vehicle and associating the vehicle with a gaming platform, comprising a computing device having a camera to capture image data of a vehicle. An optical recognition module is configured to receive the image data of the vehicle, determine a plurality of vehicle specifications, and associate the plurality of vehicle specifications with a virtual vehicle on a gaming platform provided by a gaming module. The system permits a plurality of users to compete via racing the virtual vehicles.

The system and method allow for users to capture image data of vehicles in a real-world environment to acquire and interact with the vehicle in a virtual environment wherein users race against one-another. The system allows users to earn credits or purchase credits in order to purchase or customize vehicles they have acquired. In-game purchasing may allow users to purchase vehicles or upgrades thereof.

In one aspect, the system also includes a vehicle customization module to permit communications between the users via a network. The vehicle specifications include vehicle speed, vehicle acceleration, vehicle handling, and vehicle aesthetics.

In another aspect, the vehicle aesthetics include interior and exterior vehicle aesthetics.

In one aspect, a processor, through a camera, microphone, or other devices, captures image data of a vehicle and associates the vehicle with a virtual vehicle. The vehicle specification then corresponds with the virtual vehicle and the outcome of an interaction between the virtual vehicle of one or more users is determined.

In another aspect, the processor classifies the image data and/or vehicle specification, using that classification as a basis to associate the vehicle (or the image data) with the virtual vehicle.

In yet another aspect, the processor determines the vehicle classification via classifying the image data and/or vehicle specification.

In yet another aspect, the processor applies artificial intelligence, machine learning, and/or neural networks to perform classification tasks.

In yet another aspect, the system and process detect the location of the computing device implementing the system, associate the location with the image data and share the location with the associated image data.

The gaming platform promotes the activity of users by incentivizing users to seek out vehicles in an environment that have favorable vehicle specifications. Users who compete against one another are rewarded for winning the competition.

BRIEF DESCRIPTION OF THE DRAWINGS

A complete understanding of the present invention and the advantages and features thereof will be more readily understood by reference to the following detailed description when considered in conjunction with the accompanying drawings wherein.

DETAILED DESCRIPTION

Figure 1:
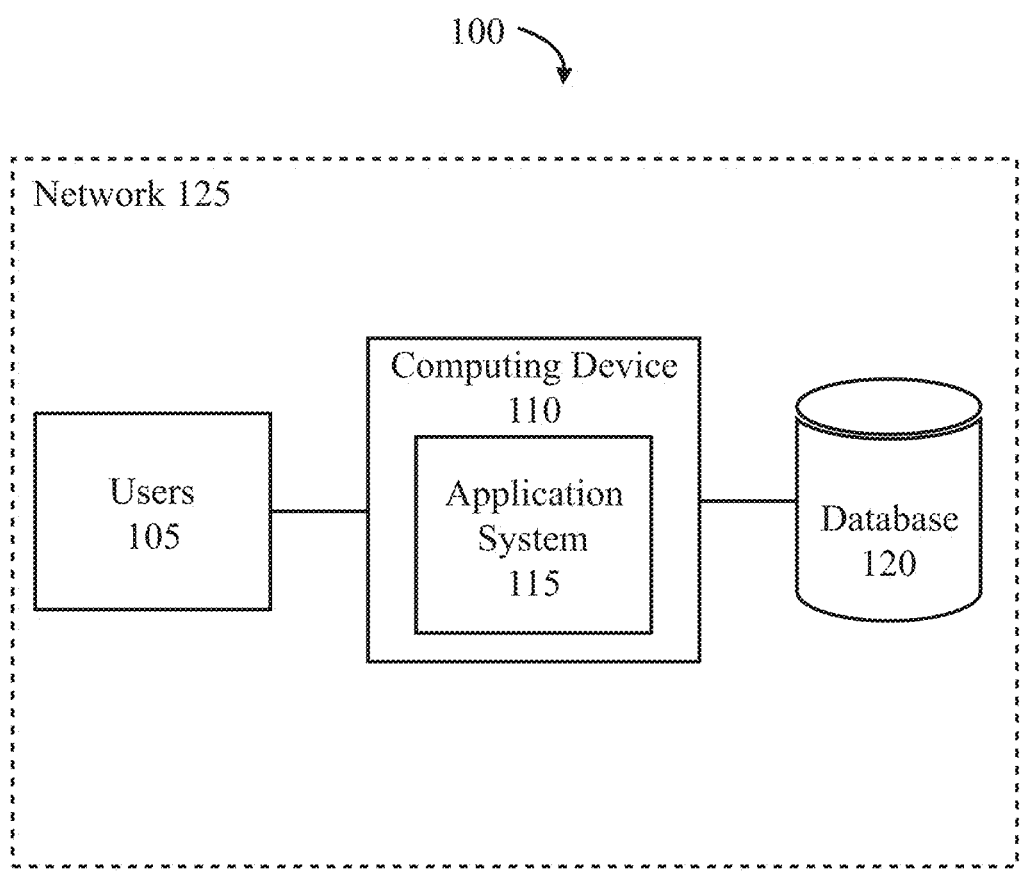
FIG. 1 illustrates a block diagram of the network infrastructure, according to some embodiments.

The specific details of the single embodiment or variety of embodiments described herein are to the described system and methods of use. Any specific details of the embodiments are used for demonstration purposes only and not unnecessary limitations or inferences are to be understood therefrom.

Before describing in detail exemplary embodiments, it is noted that the embodiments reside primarily in combinations of components and procedures related to the system. Accordingly, the system components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein, relational terms, such as "first" and "second" and the like, may be used solely to distinguish one entity or element from another entity or element without necessarily requiring or implying any physical or logical relationship or order between such entities or elements.

In general, the embodiments presented herein relate to a mobile application and gaming platform wherein users can engage with one another by racing a virtual vehicle in a virtual environment. To access and utilize vehicles in the gaming platform, the user utilizes a camera in communication with a computing device to capture an image of a vehicle in the environment. The image data is transmitted to an optical recognition engine to determine the make, model, and year of the vehicle. Once the make, model, and year of the vehicle have been determined, the system references a vehicle database to determine the operational specifications and aesthetic characteristics of the vehicle. The operational specifications can include the acceleration, top speed, handling characteristics, and other operational characteristics known in the arts. The aesthetic characteristics of the vehicle can include color options, tire and wheel options, trim options, in addition to customizable options of the vehicles exterior or interior components. Further, the database can include performance options and upgrades as known in the arts.

In some embodiments, the user captures an image of a vehicle in the environment using a camera in communication with a computing device. The user may then access a virtual vehicle corresponding to the captured vehicle while engaging with the gaming platform.

FIG. 1 illustrates the system 100 including a plurality of users 105 who are in operable communication with a computing device 110 having an application system 115 downloaded to local or remote memory. The computing device 110 can include, but is not limited to, a video game console, handheld device, tablet computing device, a mobile phone, a laptop, a smartphone and/or the like. One or more databases 120 are configured to store vehicle and user related data as described hereinabove. Each user 105 is in communication with one another via a network 125. The computing device can include a camera to capture images of an object, such as a vehicle.

The network 125 includes any technically feasible type of communications network that allows data to be exchanged between the computing device 110 and external entities or devices, such as a web server, a database, or another networked computing device. For example, network 125 may include a wide area network (WAN), a local area network (LAN), a wireless or Wi-Fi® network, Bluetooth®, and/or the Internet, among others.

Figure 2:
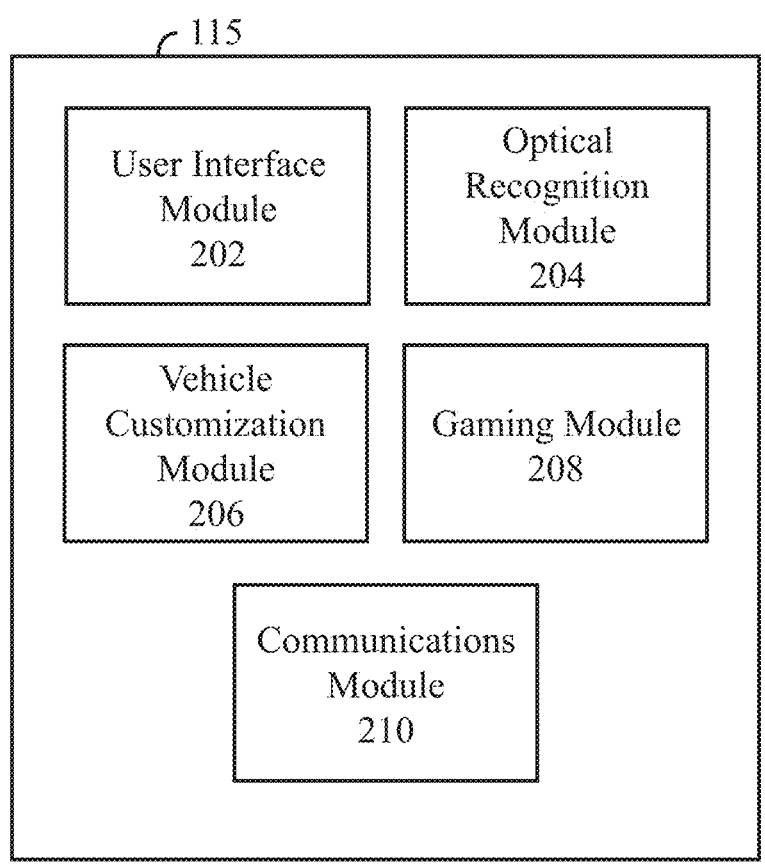
FIG. 2 illustrates a block diagram of the application system and modules, according to some embodiments.

FIG. 2 illustrates the application system 115 having a plurality of modules. The applications system, in general, provides a gaming platform wherein users of the system can capture a vehicle, which corresponds to a virtual vehicle. Users may then compete with the virtual vehicle on the gaming platform. The application system 115 may be comprised of a user interface module 202 providing mobile application functions on the computing device as known in the arts. The optical recognition module 204 receives image data from the camera of the computing device and compares the optical image data to image data stored in the external database to determine the make, model, and year of the vehicle in addition to other vehicle specifications as described hereinabove. A vehicle customization module 206 stores vehicle customization components and allows the user to alter the virtual vehicle to include the customization components, and thus alter the vehicle specifications. The gaming module 208 provides a means for users to compete with one another. In one example, the gaming module 208 allows users to race against one another using virtual vehicles. A communications module 210 permits users to communicate with one another while engaging with the various features of the application system 115.

Figure 3:
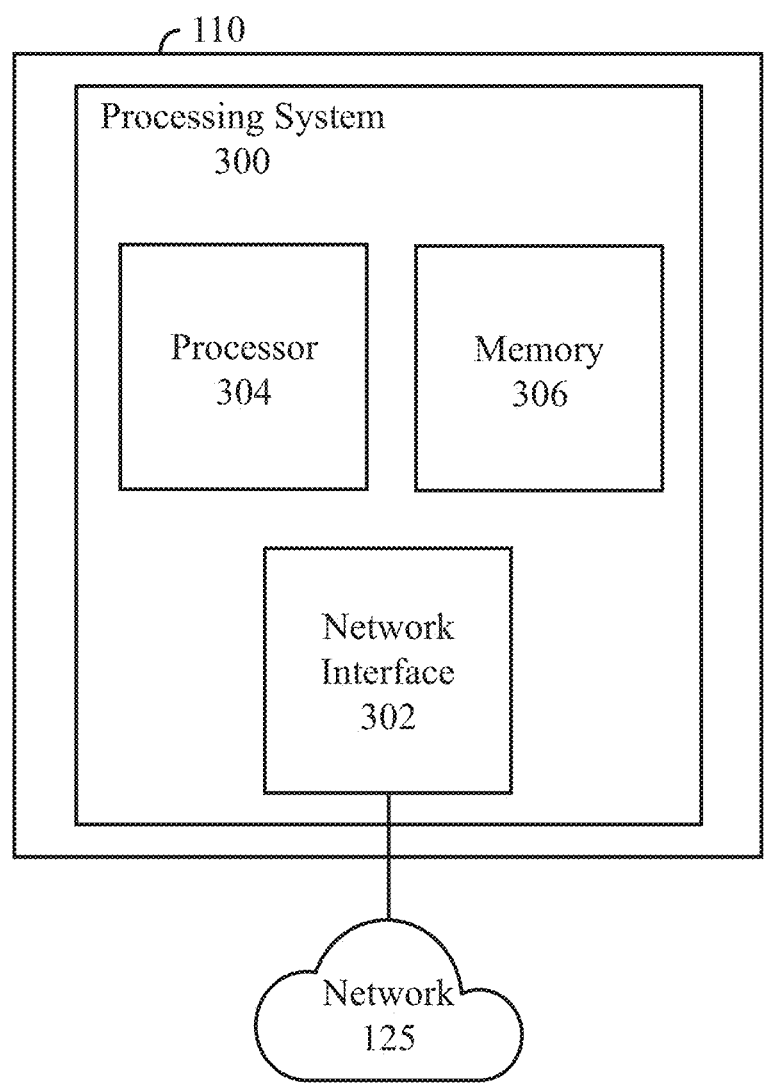
FIG. 3 illustrates a block diagram of the computing device components associated with the application system, according to some embodiments.

FIG. 3 illustrates a block diagram of the computing device 110 which can include at least one network interface 302 through which the computing device 110 may communicate with external components of the system either directly or via the network 125. Computing device 110 further includes a processing system 300 programmed or otherwise arranged to implement the system as described hereinabove. Processing system 300 may include one or more processors 304, and a memory module 306. The processing system 300 is coupled to the network interface 302 to enable the processing system 300 to communicate via the network 125 with the devices and computing devices of the gaming platform in addition to various components of the system.

The steps and/or actions of a method or system described in connection with the embodiments disclosed herein may be embodied directly in hardware, in a software module executed by a processor (such as processor(s) 304), or in a combination of the two. Processor(s) 304 include any suitable processor implemented as a central processing unit (CPU), a graphics processing unit (GPU), an application-specific integrated circuit (ASIC), a field programmable gate array (FPGA), an artificial intelligence (AI) accelerator, any other type of processing unit, or a combination of different processing units, such as a CPU configured to operate in conjunction with a GPU. In general, processor(s) 304 may be any technically feasible hardware unit capable of processing data and/or executing software applications. Further, in the context of this disclosure, the computing elements shown in computing device 110, processing system 300, network 125, and/or system 100 may correspond to a physical computing system (e.g., a local computing device or server, a networked computing device or server, etc.) or may be a virtual computing instance executing in a virtual machine and/or within a computing cloud service.

Software programs, including software modules (such as the modules illustrated in FIG. 2) may reside in a memory (such as memory 306) and/or in an application system (such as application system 115) inside a memory (such as memory 306) which may be RAM memory, flash memory, ROM memory, EPROM memory, EEPROM memory, firmware, registers, a hard disk, a removable disk, a CD-ROM or DVD or Blu-Ray®, server storage, database storage, cloud storage, and/or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an Application Specific Integrated Circuit (ASIC). In the alternative, the processor and the storage medium may reside as discrete components in a computing device. Additionally, in some embodiments, the events and/or actions of a method or algorithm may reside as one or any combination or set of codes and/or instructions on a machine-readable medium and/or computer-readable medium, which may be incorporated into a computer program product. Memory 306 includes various software programs (including application system 115) that can be executed by processor(s) 304, computing device 110, and/or other devices of system 100 and application data associated with said software programs, including software that embodies modules, devices, and/or components described in this disclosure; that runs methods, steps, and processes such as the software, methods, steps, and/or processes described in this disclosure; and/or that when executed causes, provokes, and/or triggers the operations, determinations, selections, comparisons, functions, and/or results intended as described in this disclosure. In some embodiments, some and/or at least part of the software programs reside in one or more devices and/or components of computing device 110 and/or system 100 other than memory 306. For example, in some embodiments, software that operates the circuits or electronics of the camera of the computing device 110 and/or circuits that operate, drive, or lead to the camera (such as circuits of an input/output device) reside in firmware that is part of the camera circuits and/or firmware of the circuits that operate, drive, or lead to the camera. In embodiments of the present invention, the processor(s) 304 receives code instructions of application system 115 from memory 306 and executes the code instructions of application system 115 to generate the signals and instructions that operate or cause the operation of the various modules, components, and/or devices of the computing device 110 and/or of the application system 115 itself.

In one or more embodiments, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates the transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection may be termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc," as used herein, include compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

Figure 4:
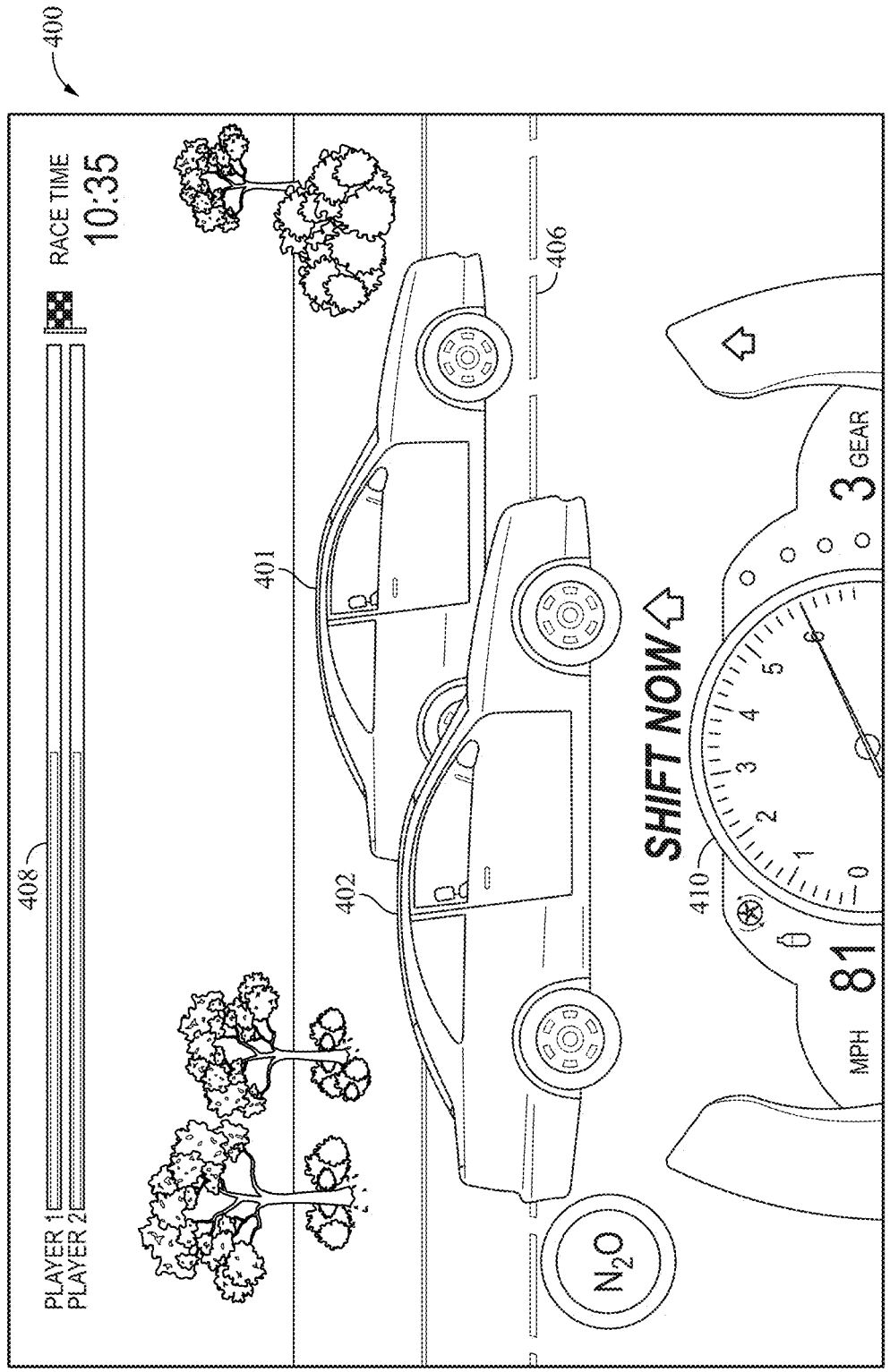
FIG. 4 illustrates a screenshot of the racing interface provided on the display of a computing device, according to some embodiments.

FIG. 4 illustrates a screenshot of the racing interface 400 provided on the display of a computing device. The racing interface 400 illustrates racing content 401 presented within the racing interface 400 in which various racing events occur dependent on user controls. A first vehicle 402 controlled by and corresponding to a first user, and a second vehicle 404 controlled by and corresponded to a second user. In such, each user experiences user-customizable interactive racing content 401 which allows the user to interact with a virtual racing environment 406. A status indicator 408 to indicate the status of each user as determined by their progress, position, speed, or other metric during a race scenario. A control interface 410 provides vehicle control to the user which may include a steering wheel, acceleration and deceleration controls, transmission gear shift controls, and other controls common in virtual vehicle control systems.

In some embodiments, each vehicle (e.g., the first and second vehicle illustrated in FIG. 4) corresponds to a vehicle acquired by a specific user of the system. In such, each vehicle has pre-determined characteristics determined by the user corresponding to the vehicle. For example, although two users may be racing the same vehicle make and model, each user may have customized their corresponding car to have specific characteristics, resulting in differing performance characteristics for the vehicles, and thus resulting in various outcomes of a race depending on the opponent, race conditions, etc.

As used herein, a video game can be an electronic game which involves human interaction with a user interface to generate visual feedback on a computing device within a racing environment. It should be appreciated that the racing environment can be executed within a computing device as described herein. The computing device can include, but is not limited to, a video game console, handheld device, tablet computing device, a mobile phone, a laptop, a smartphone and/or the like. The racing environment can include one or more user interactive elements. Elements can include, but are not limited to, playable characters, non-playable characters, environmental elements, and the like. Further, the racing environment can conform to any genre including, but not limited to, a simulation genre, a strategy genre, a role-playing genre, and the like.

As used herein, the term "environment" is used to describe a physical space surrounding a user of the gaming platform. In some examples, the environment can include a parking lot, roadway, racetrack, or other location where vehicles are present. The term "virtual environment" is used to describe the virtual space in which users interact with one another, such as a virtual raceway.

Figure 5:
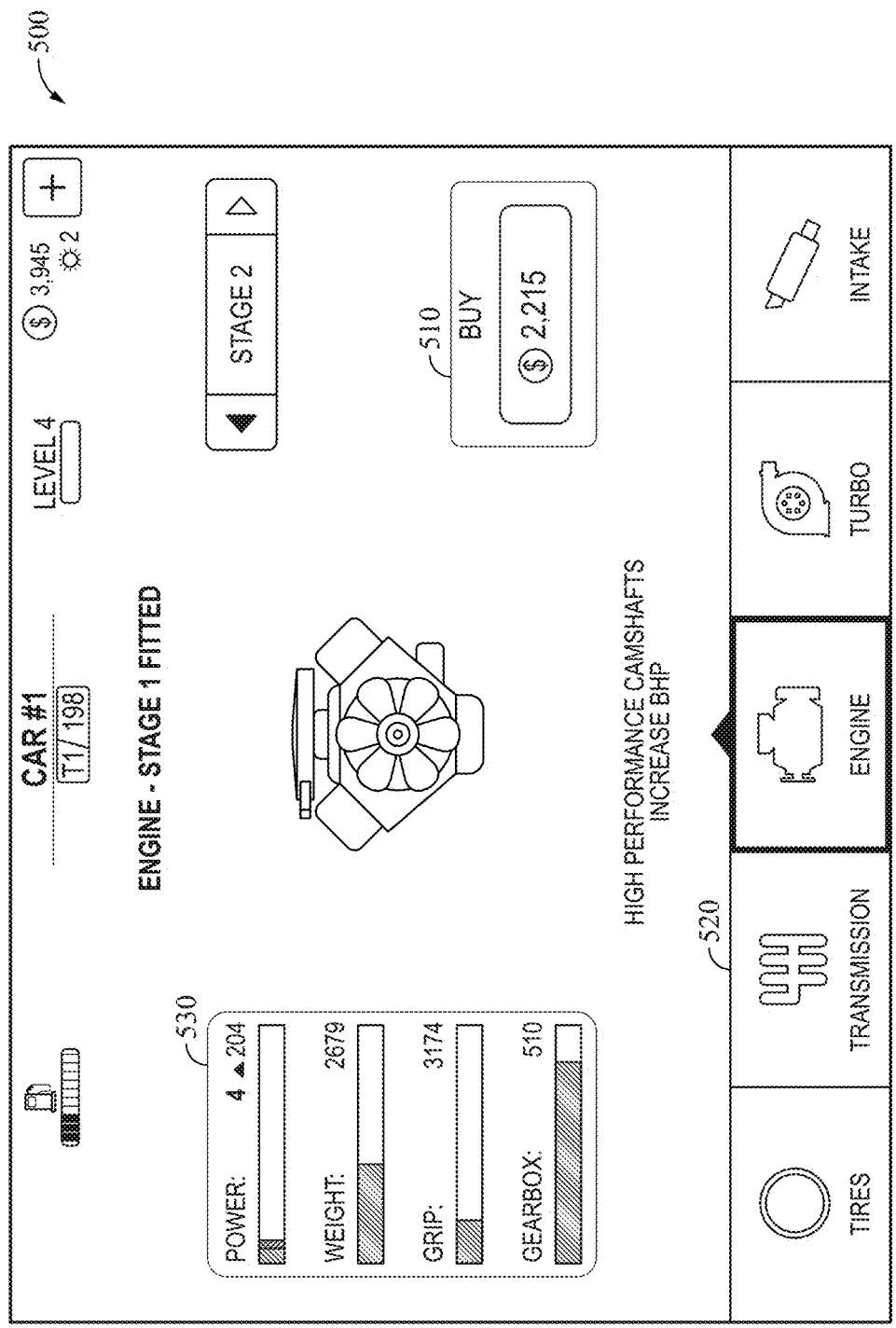
FIG. 5 illustrates a screenshot of the customization interface provided on the display of a computing device, according to some embodiments.

FIG. 5 illustrates a customization interface 500 wherein the user may select from various customizable components and/or features related to a plurality of vehicles corresponding to the user. For example, customizable components 520 may include engine, transmission, exhaust, fabrication, tires, brakes, and the like which may affect the performance of the vehicle. Customizable features may include exterior and/or interior color, wheels, trim, and the like which may affect the aesthetic characteristics of the vehicle. Credits 510 earned during gameplay (i.e., by winning races against opponents or accomplishing in-game tasks) may be utilized to permit the user to purchase vehicle components or aesthetics. In an alternative embodiment, the user may utilize in-game purchasing to purchase credits which can be used to purchase the customizable component or feature.

In some embodiments, the user corresponding to the vehicle may earn points that permit the purchase of components and/or features, which may customize the in-game performance and appearance of the vehicle with which the user utilizes to race an opponent (e.g., another user).

Figure 6:
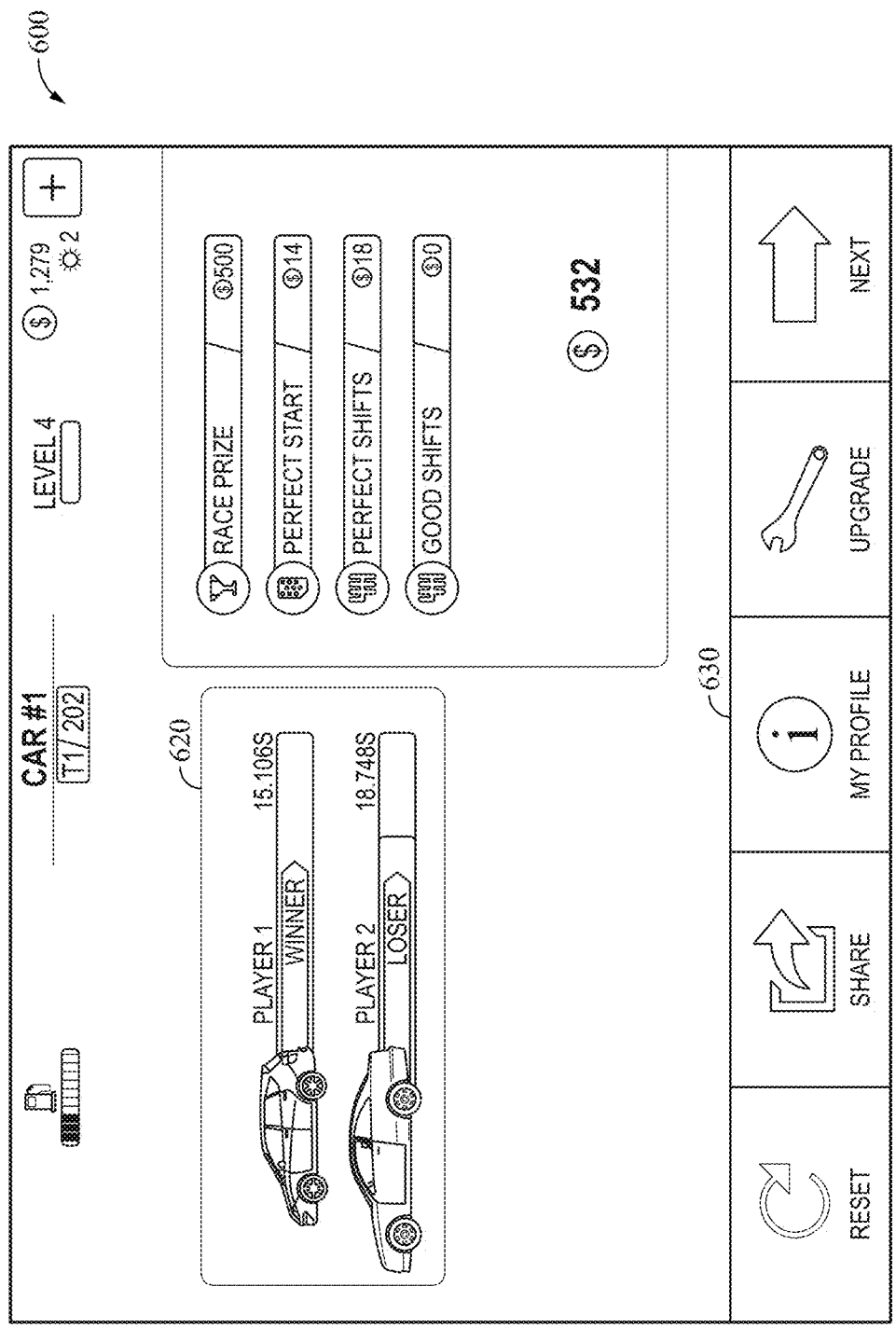
FIG. 6 illustrates a screenshot racing results interface provided on the display of a computing device, according to some embodiments.

FIG. 6 illustrates a results interface 600 wherein the user may review results of a race with another user. For example, a results portion 620 provides the standings for each user who engaged in the racing scenario. As illustrated, the first user (Player 1) won the race in 15.106 seconds. The results interface may include statistics for the race, including starting statistics, shifting statistics, length of the race, final time taken to complete the race or phases thereof, among other statistics known in the arts. Each statistic may earn the user credits or other accolades. A plurality of selectable tabs 630 may be provided to allow the user to navigate through various interfaces of the system. For example, the selectable tabs 630 may include a "Reset" tab, a "Share" tab, a "My Profile" tab, an "Upgrade" tab, and a "Next" tab. For example, the Share tab may permit the user to share the results of one or more races with other users of the system, social media systems, or contacts. In another example, the Upgrade tab provides the user with the customization interface as shown and described in FIG. 5, or may provide other means for upgrading the vehicle, the users profile, their membership, or likewise customizable features of the system.

Figure 7:
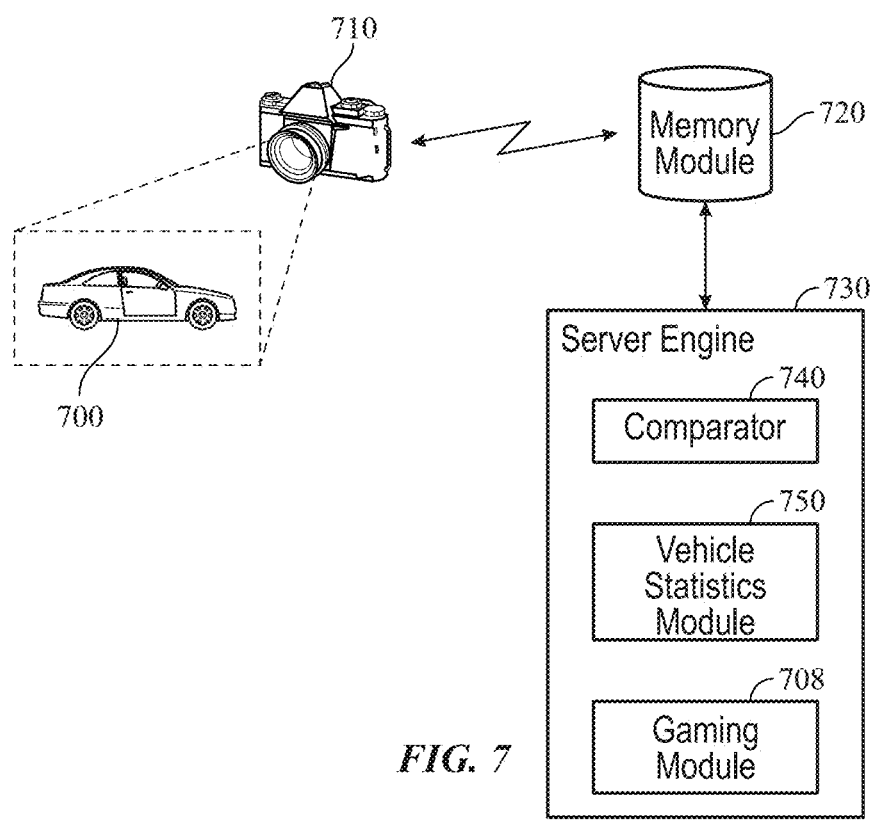
FIG. 7 illustrates a schematic of the image capturing system, according to some embodiments.

FIG. 7 illustrates a schematic of the vehicle identification system, comprising a vehicle 700 an in environment. A camera 710 is operated by a user to capture image data of the vehicle 700. The image data may include audio, video, or still image data of the vehicle 700. The image data is transmitted to a memory module 720, which stores the image data and which is then transmitted to a server engine 730 that processes the image data to determine one or more of the following: a vehicle make, a vehicle model, a vehicle year, a vehicle color, a tire type, a wheel type, vehicle aftermarket accessories, and other identifying characteristics of the vehicle corresponding to the image data provided by the camera 710. To identify the vehicle 700, a comparator 740 may be utilized to compare the vehicle image data with stored image data for a plurality of vehicles. Once the vehicle 700 is identified, a vehicle statistics module 750 determines statistics for the vehicle which will correspond to performance characteristics of the vehicle.

In some embodiments, the server engine 730 is implemented by the application system 115. In some embodiments, the server engine 730 resides in, operates in and/or with, is in a server connected to, and/or is otherwise part of the network 125. In some embodiments, an instance of the server engine 730 is implemented partially or entirely by the application system 115 while another partial or entire instance of the server engine 730 resides in, is in a server connected to, and/or is otherwise part of the network 125. The server engine 730, through a gaming module 708 that incorporates the characteristics of gaming module 208, is configured to implement the game logic, game rules, data routing, communication routing, and/or the like, enabling the users 105 to use the application system 115 to play the game with other users 105. The gaming module 708 provides the gaming platform based on implementing the game logic, game rules, data routing, communication routing, and/or the like, and enabling the users 105 to use the application system 115 to play the game with other users 105 (including coordinating the operation and communication between all other modules of the application system 115/815, as discussed below the next FIGS. 8-10). In some embodiments, the server engine 730, via the gaming module 708, is configured to transmit real-time communications between different application systems 115 that reside in various computing devices 110 operated by different users 105, and/or saves such communications for later transmission (for example, when a particular user 105 is not using, is temporarily disconnected from, has a slow connection to, or is logged out from the game server, the server engine 730, the network 125, and/or the application system 115).

The camera 710 is configured to capture photos and/or video. In some embodiments, the camera 710 includes a microphone and is configured to capture audio, photos; video; audio and video; photos with associated audio; video and photos (either with or without audio) in intermittent, simultaneous, concurrent, and/or concomitant manner; and/or the like.

Note that the functions and operations of comparator 740 appear to overlap with those of the optical recognition module 204. In some embodiments, optical recognition module 204 sends the optical image data stored in memory 306/memory module 720 to the database 120 and/or server engine 730. The server engine 730 receives from the optical recognition module 204 and/or takes from the database 120 the optical image data and/or previously stored image data, followed by the comparator 740 comparing the optical image data to the previously stored image data to determine the make, model, and year of the vehicle in addition to other vehicle specifications as described hereinabove. In some embodiments, the optical recognition module 204 takes, requests and/or receives the previously stored image data and compares the optical image data to the previously stored image data to determine the make, model, and year of the vehicle in addition to other vehicle specifications as described hereinabove. In some embodiments, the optical recognition module 204 and/or the comparator 740 determines which type of virtual vehicle to assign, produce, or unlock in application system 115 and/or gaming module 208/708 based on the make, model, and year of the vehicle determined or selected from comparing the optical image data to the previously stored image data. In some embodiments, the optical recognition module 204 and/or the comparator 740 determines the make, model, and year of the vehicle from the optical image data, and/or which type of virtual vehicle to assign, produce, or unlock, by using artificial intelligence, as discussed below regarding optical recognition module 904 and classification module 905 of FIG. 9.

Through the use real-time or delayed vision object recognition, objects, logos, artwork, products, locations and other features that can be recognized in the image and/or video stream can be matched to data associated with such to assist the user with vehicle recognition and determining information and/or services, which may be beneficial based on such vehicle recognition. In specific embodiments, the data that is matched to the images in the image stream is specific to vehicle performance databases, vehicle aftermarket parts databases, vehicle specification databases and the like.

Figure 8:
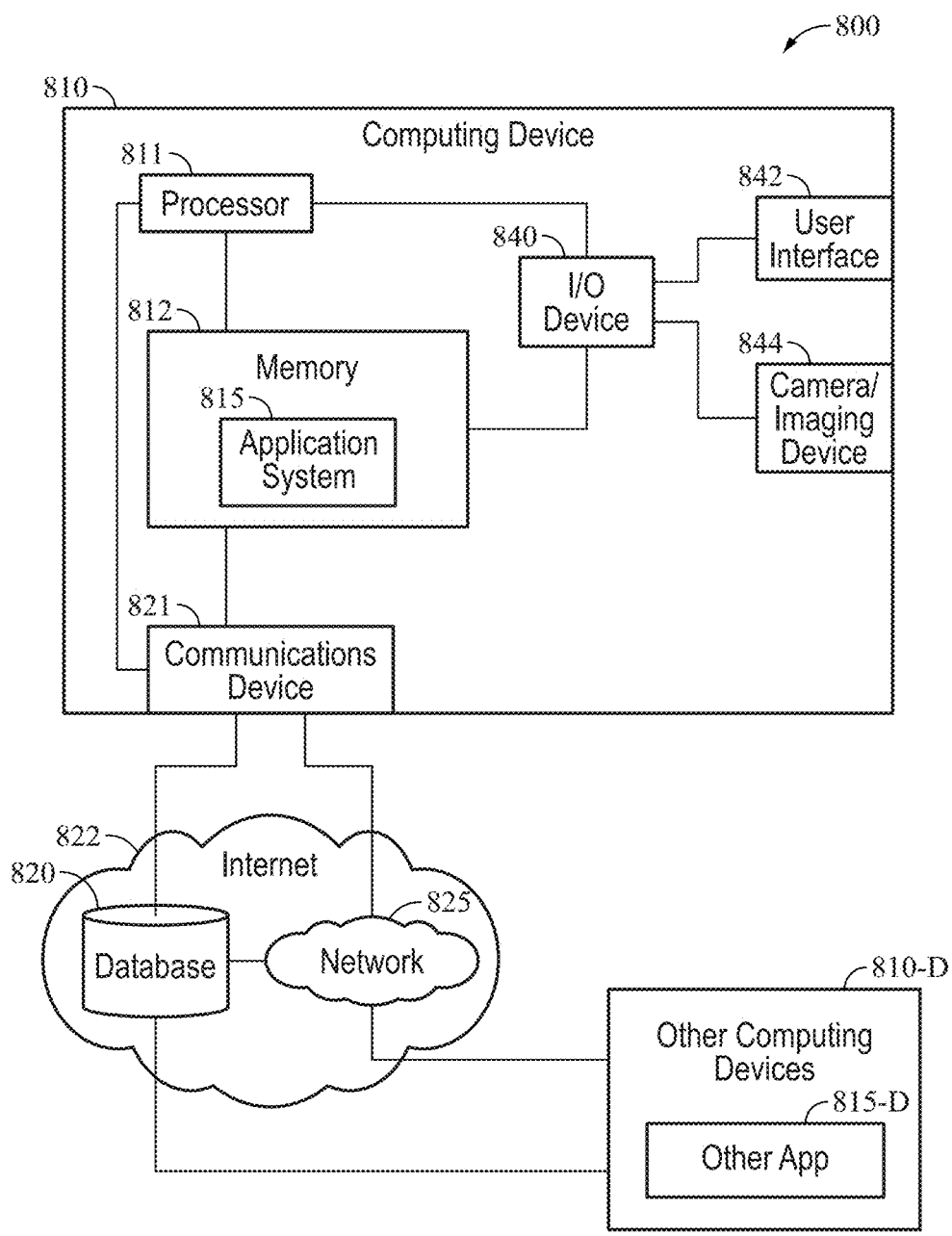
FIG. 8 illustrates a block diagram of a computing device connected to various internal and external devices.

FIG. 8 illustrates a block diagram of a system 800 that incorporates the characteristics of system 100. The system 800 includes a computing device 810, other computing devices 810-D, a database 820, a network 825, and internet 822. The computing device 810 (which incorporates the characteristics of computing device 110) connects to the database 820 (which incorporates the characteristics of the database 120) and also connects to a network 825 (which incorporates the characteristics of the network 125). The computing device 810, through a communications device 821, connects to the database 820 and to the network 825 via internet 822. Other computing devices 810-D that include other application systems 815-D, which incorporate the characteristics of application systems 815, also connect to the database 820 and to the network 825 via the internet 822.

The internet 822 is to be understood as (but not limited to), whether public and/or private, any local, regional, national, and/or global network of computers, servers, and/or electronic devices relying on, whether public and/or private, any general or particular infrastructures and systems (for example, servers, databases, domain name system or DNS servers, nameservers, internet layers, wired communication systems, wireless systems, satellite systems, optical communication systems), network protocols (such as HTTP, HTTPS, TCP/IP, IPv4, IPv6, FTP, SMTP, ICMP, and VPN), and communication devices that enable the connection and the transmission and reception of packets, data, signals, and/or information between the computers, servers, and/or electronic devices connected to the internet 822, including but not limited to the past, current, and future versions of the internet. In some embodiments, internet 822 and network 825 are equivalent to each other and refer to the same thing.

While FIG. 1 shows that the database 120 is inside the network 125, FIG. 8 shows the database 820 outside the network 825. In some embodiments database 120, 820 is inside and/or outside the network 125, 825. In some embodiments, the network 125, 825 includes and/or is connected to the server engine 730 of FIG. 7 (or to the one or more servers that implement server engine 730). In some embodiments database 120, 820 is implemented partially or entirely inside memory 306, 812.

The computing device 810 includes a processor 811 connected to a memory 812, the communications device 821, and an input/output device 840 (or I/O device 840). The memory 812, which incorporates the characteristics of memory 306 and/or memory module 720, contains the executable code that comprises the application system 815, which incorporate the characteristics of application system 115. The memory 812 is connected to the I/O device 840 and the communications device 821. The processor(s) 811 receives code instructions of application system 815 from memory 812 and executes the code instructions of application system 815 to generate the signals and instructions that operate or cause the operation of the various modules, components, and/or devices of the computing device 810 (including memory 812, communications device 821, I/O device 840, user interface 842, and/or camera/imaging device 844) and/or of the application system 815 itself.

The I/O device 840 is connected to a camera/imaging device 844, which incorporates the characteristics of camera 710, and a user interface 842. The I/O device 840 includes the hardware, firmware, and/or software for the computing device 810 to interact with other components and devices, including the camera/imaging device 844, the user interface 842, and/or the like. In some embodiments, the computing device 810, through the I/O device 840, connects to the database 820 and to the network 825 via the internet 822, overlapping with and/or replacing the functions of the communications device 821, and/or overlapping with and/or replacing the communications device 821 itself.

The user interface 842 includes devices capable of providing input and/or output, such as, a touch-sensitive screen or touchscreen, speakers, a microphone, and so forth. In some embodiments, interface 842 includes devices such as a keyboard, a mouse, buttons, a display, an external display, indicator lights, haptic devices and sensors, a universal serial bus (USB) port, and/or the like. The interface 842 is configured to receive various types of input from a user 105 and to also provide various types of output to the user 105, such as audio, displayed digital images or digital videos or text, with or without audio. In some embodiments, the user interface 842 is configured to sense, accept, record, detect, capture, receive, and/or input the touches, pressings, gestures, speech, voice, and/or commands (such as voice commands, tactile commands, detected gestures, and/or the like) associated with the operation and execution of the application system 815, including but not limited to the racing interface 400, the customization interface 500, and/or the results interface 600, and including those from the user 105 which include those that would cause the camera/imaging device 844 to operate and/or capture content as described herein. In some embodiments, the user interface 842 is configured to perform, show, emit, sound off, deliver, and/or output the images, graphics, text, animations, photos, audio, and/or video associated with the operation and execution of the application system 815, including but not limited to the racing interface 400, the customization interface 500, and/or the results interface 600. In some embodiments, the user interface 842 is embedded and/or integrated with the computing device 810. For example, the computing device 810 may have a display (where the display is the user interface 842) on the housing that encloses the computing device 810. In some embodiments, the user interface 842 is, partly or entirely, wirelessly coupled with the computing device 810. For example, in some embodiments, the computing device 810 is wirelessly coupled to a wireless display with a wireless speaker (where the wireless display and speaker are parts of the user interface 842 that output visual and/or aural content) and a touchscreen (where the touchscreen is part of the user interface 842 that inputs tactile commands and outputs visual content) mechanically coupled to the housing that encloses the computing device 810.

In some embodiments, the I/O device 840 is not directly connected to one or more of camera/imaging devices 844 and/or the user interfaces 842. In such embodiments, the I/O device 840 connects wirelessly to the one or more of the camera/imaging devices 844 and/or the user interfaces 842 through the internet 822 and/or through the network 825 via the communications device 821.

The communications device 821 sends and/or receives data between the computing device 810 and the database 820, the network 825, the other computing devices 810-D, the other application systems 815-D, external entities or devices, and/or the like through the internet 822. Data includes, but is not limited to, information, signals, connections, requests, responses, credentials, authorizations, rejections, packets, transfers, images, photos, text, graphics, video, audio, content, and/or the like. In some embodiments, the communications device 821 sends and/or receives data through the network 825. In some embodiments, the communications device 821 sends and/or receives data wired and/or wirelessly. In some embodiments, the computing device 810, through the communications device 821, connects to the user interface 842 and/or the camera/imaging device 844, overlapping with and/or replacing the functions of the I/O device 840, and/or overlapping with and/or replacing the I/O device 840 itself.

In some embodiments, the communications device 821 (and/or other components, software, hardware, and/or circuits of the computing device 810) is(are) configured to determine a physical and/or geological location of the computing device 810 based on one or more location signals. In some embodiments, the computing device 810 and/or the communications device 821 include a location module configured to determine the physical and/or geological location of the computing device 810 based on one or more location signals. The one or more location signals include, but are not limited to, Wi-Fi®, Bluetooth®, shared location information between the computing device 810 and other computing devices 810-D, location signals and/or signals with location information based on one or more of the global navigation satellite systems (GNSS) constellations (GPS and GIS, QZSS, BEIDOU, GALILEO, GLONASS).

The communications device 821 (and/or the location module) is(are) configured to send the physical and/or geological location of the computing device 810. The computing device 810 is configured to associate the physical and/or geological location to any input from the communications device 821 and/or the I/O device 840. For example, if the user 105 finds a vehicle 700 and captures a photo or image of the vehicle 700 through the camera/imaging device 844, the communications device 821 (and/or the location module) associate the current physical and/or geological location of that photo or image of the vehicle 700. The applications system 815, through the communications device 821, is configured to send the image data of the photo or image of the vehicle 700 along with the physical and/or geological location of the vehicle 700 to the database 820 for storage and/or to the other application systems 815-D. With the image data and location information of the vehicle 700 (received directly and/or received from the database 820), the users 105 of the other application systems 815-D are notified of the availability and location of the vehicle 700, and can decide whether to go to that location and capture an image of the vehicle 700.

Figure 9:
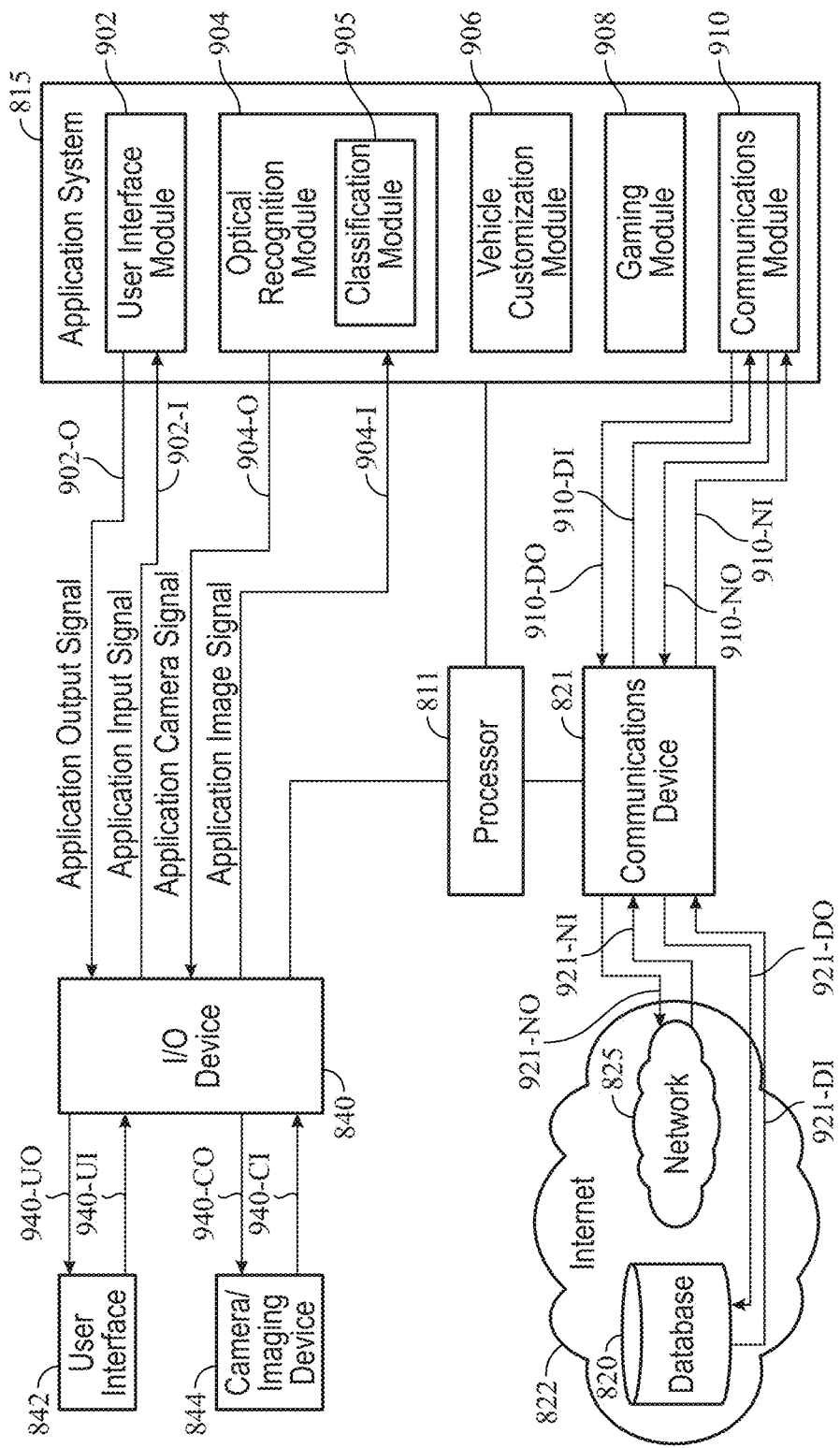
FIG. 9 illustrates a block diagram of an application system including various modules and connected to various internal and external devices.

FIG. 9 illustrates the interactions and operations between modules of the application system 815 and the various devices and components illustrated in FIG. 8. To focus on and explain the operation of the modules of the application system 815 in FIG. 9, references to computing device 810 and memory 812 are removed, and connections between devices and with modules of application system 815 are expanded into the representative signals that come in and out of each module. Connections between most devices illustrated in FIG. 8 are maintained (or expanded) in FIG. 9.

FIG. 9 illustrates application system 815 including a user interface module 902, an optical recognition module 904, a vehicle customization module 906, a gaming module 908, and a communications module 910. The optical recognition module 904 includes a classification module 905. In some embodiments, the classification module 905 is a separate module, not included in optical recognition module 904.

The user interface module 902 generates an application output signal 902-O based on the state of the game and/or parameters generated by the application system 815 and/or the gaming module 908, which incorporates the characteristics of gaming module 708. The state of the game is the situation that the game presents to user 105. For example, when the user 105 is playing the game, like when the game displays the results interface 600 and waits for input from the user 105 as described above for the results interface 600, such as the user 105 selecting any of the plurality of selectable tabs 630, such situation is the result of the user interface module 902 generating the application output signal 902-O based on the state of the game and/or parameters. The state of the game results in the application output signal 902-O including the content (such as audio, sounds, video, photos, images, graphics, and/or the like), information, signal, parameters, and/or data that corresponds to and/or causes the generation of one or more user interface output signals 940-UO, and therefore results in the displaying, presenting, or output related to the state of the game, which is outputting the content including displaying the results interface 600 to the user 105. The game parameters are the data and/or information that describes, details, customizes and/or tailors the gaming experience to the user 105, including data and/or information that describes, details, customizes and/or tailors at least one of the state of the game, content corresponds to the state of the game, content to output and display (for example, when the content includes music but the user selected no music or no sound), all the elements illustrated in FIGS. 4, 5, and 6 (whether or not enumerated, identified, described and/or mentioned in this disclosure) and all elements mentioned in relation to FIGS. 4, 5, and 6 in this disclosure, how long the game has been idle, whether there is a network or internet connection, the name and/or handle and/or identifier of the user 105, the operational state of the application systems 815, the operational state of the computing device 810 and/or its components, the state of the game and/or the game parameters of other application systems 815-D, the operation state of other computing devices 811-D, any and all other elements or characteristics or details mentioned in this disclosure, and/or the like.

The user interface module 902 is configured to send the application output signal 902-O to the I/O device 840. The application output signal 902-O is a signal that contains content data (data of audio, video, images, photos, text, graphics, haptic sensation instructions, other content, and/or the like) that causes the I/O device 840 to generate one or more user interface output signal 940-UO and to send the output content signal to one or more components or devices of the user interface 842. The I/O device 840 is configured to process (including analyze and/or responds to) the application output signal 902-O. Based on the application out signal 902-O (and/or based on the analysis and/or response to the application output signal 902-O), the I/O device 840 is configured to generate a user interface output signal 902-UO configured to cause the user interface 842 (or one or more components or parts of the user interface 842) to generate an intended output to the user that is intended as part of the status, operation and/or execution of the game, the application system 815, and/or the computing device 810. For example, at a particular moment of the game, when it is intended for the user 105 to hear a sound, see the results interface 600, and read a text from another user 105, the user interface output signal 902-UO causes a speaker of the user interface 842 to make the desired sound, and cause a touchscreen to display the results interface 600 plus the text from the other user 105.

When the user 105 interacts in any manner with the user interface 842 that corresponds to a desired input or action in the game, the user interface 842 (or the corresponding component(s) or device(s) of the user interface 842) senses or detects such user input and generates a user input signal

940-UI. The user input signal 940-UI contains the data or information that corresponds to the inputs provided by the user 105 to the user interface 842. The user interface 842 is configured to send the user input signal 940-UI to the I/O device 840. The I/O device 840 is configured to process the user input signal 940-UI and to generate an application input signal e based on the user input signal 940-UI.

The user interface module 902 is configured to receive and process the application input signal 902-I. The user interface module 902 determines to which of the other modules to send the user input received based on the application input signal 902-I. For example, if the application input signal 902-I is text to be sent to other users 105, the user interface module 902 send the text, recipient information, and any other relevant information to the communications module 910; but if the application input signal 902-I is a racing command during gameplay, the user interface module 902 sends the racing command information to the gaming module 908. In some embodiments, the interface module 902 sends all information to the gaming module 908 for routing. In some embodiments, the interface module 902 sends all information to all modules, leaving each module to determine whether to process the information.

The optical recognition module 904 is configured to generate the application camera signal 904-O based on a user input signal 940-UI that orders the operation of the camera/imaging device 844. The optical recognition module 904 is configured to send the application camera signal 904-O to the I/O device 840. The application camera signal 904-O is a signal that contains data and/or information for operating the camera/imaging device 844. The I/O device 840 is configured to process (analyze and/or respond) to the application camera signal 904-O. The I/O device 840 is configured to generate a camera output signal 940-CO based on the application camera signal 904-O and/or the processing of the application camera signal 902-O. The camera output signal 940-CO operates the camera/imaging device 844, including causing the camera/imaging device 844 to capture and/or record photos, audio, video, and/or the like, as was previously described above in the discussion of FIG. 8.

The camera/imaging device e is configured to transform the captured and recorded content to a camera input signal 940-CI. In some embodiments, the camera/imaging device 844 is configured to generate the camera input signal 940-CI based on the captured and/or recorded content. The camera/imaging device 844 is configured to send the camera input signal 940-CI to the I/O device 840. Generally, the camera input signal 940-CI will be raw and need processing for use by the optical recognition module 904 and/or the application system 815. The I/O device 840 is configured to process the camera input signal 940-CI and to generate the application image signal 904-I based on the camera input signal 940-CI and/or the content of the camera input signal 940-CI. The camera input signal 940-CI is a signal that contains the content captured and/or recorded by the camera/imaging device 844 in a format that can be processed, used, accepted, and/or understood by the optical recognition module 904.

As illustrated in FIG. 9, the optical recognition module 904 includes a classification module 905 which incorporates the characteristics of comparator 740. The classification module is configured to implement and/or train an artificial intelligence system, machine learning system, deep learning system, neural network system, convolutional neural network system, and/or the like, including combinations of such systems operating to achieve different determinations and/or classifications, and/or combinations of such systems that feed into other such systems. In some embodiments, the classification module 905 operates separately from the optical recognition module 904. The classification module 905 is configured to classify image data of vehicles. In some embodiments, the classification module 905 determines a plurality of vehicle specifications, and associates the plurality of vehicle specifications with a virtual vehicle on a gaming platform provided by a gaming module based at least on the application image signal 904-I. In some embodiments, the classification module 905 is configured to associate one or more vehicle specifications with a virtual vehicle on a gaming platform provided by a gaming module based at least on the application image signal 904-I. In some embodiments, the classification module 905 is configured to determine one or more vehicle specifications based at least on the application image signal 904-I. In some embodiments, the classification module 905 is configured to classify image data into vehicle specifications and/or virtual vehicles based at least on the application image signal 904-I. In some embodiments, other basis on which the classification module 905 bases determinations, associations, and/or classifications include the application input signal 902-I, the application image signal 904-I, the communications input signal 910-DI, the network input signal 910-NI, and/or any part or subcomponent of any such signals, as discussed above and below in this disclosure.

The vehicle customization module 906, which incorporates the characteristics of vehicle customization module 206, stores vehicle customization components and allows the user 105 to alter one or more virtual vehicles to include the customization components, and thus alter the vehicle specifications. In some embodiments, the vehicle customization module 906 includes vehicle specifications and/or virtual vehicle specifications that the optical recognition module 904 and/or the classification module 905 use and/or access to inform the determinations and/or classifications, to compare with image data in the process of determinations and/or classifications, and/or to train models used for determinations and/or classifications.

The communications module 910 is configured to generate a content data output signal 910-DO that contains data, content, and/or information to be stored in the database 820. The communications module 910 is configured to send the content data output signal 910-DO to the communications device 821 through the internet 822 and/or the network 825. The communications device 821 is configured to process, analyze, and/or respond to the content data output signal 910-DO. The communications device 821 is configured to generate a database output signal 921-DO based on the content data output signal 910-DO and/or the processing of the content data output signal 910-DO. The communications device 821 is configured to send the database output signal 921-DO to the database 820 through the internet 822, the network 825 (not shown in FIG. 9, see FIG. 8), a direct connection between the database 820 the communications device 821, and/or the like. The database output signal 921-DO communicates with and/or operates the database 820, including causing the database 820 to connect, authenticate, verify user, receive and/or accept and/or store content (photos, audio, video, game parameters, vehicle specifications, and/or the like), transmit and/or send content, transform information, duplicate data, read records, delete records, save records, and/or the like. The database 820 is configured to connect, authenticate, verify user, receive and/or accept and/or store content (photos, audio, video, game parameters, vehicle specifications, and/or the like), transmit and/or send content, transform information, duplicate data, read records, delete records, save records, and/or the like, based on the database output signal 921-DO.

The database 820 is configured generate a database input signal 921-DI to transmit and/or send stored content and/or responses to the communications device 821 based on the database output signal 921-DO. In some embodiments, the database 820 is configured to generate the database input signal 921-DI based on content and/or data stored in the database. The database 820 is configured to send the database input signal 921-DI to the communications device 821. Generally, the database input signal 921-DI will be wrapped in headers, divided into packets, transformed to fit communication protocols, and/or the like, and need processing for use by the communications module 910 and/or the application system 815. The communications device 821 is configured to process the database input signal 921-DI and to generate the content data input signal 910-DI based on the database input signal 921-DI and/or the data, content, and/or information of the database input signal 921-DI. The content data input signal 910-DI is a signal that contains the stored content sent by the database 820 and/or a response from the database 820 (for example, a transmission of a message indicating that the saving of data in the database 820 was successful, a response from the database 820 that a requested image is not available, etc.) in a format that can be processed, used, accepted, and/or understood by the communications module 910.

Furthermore, the communications module 910 is configured to generate a communication output signal 910-NO that contains data, content, and/or information to be sent through the network 825 to one or more of the database 820 (not shown), other computing devices 810-D (not shown), and/or any other possible electronic devices (for example, displays connected via Wi-Fi® to the computing device 810, speakers connected via Bluetooth®, and/or the like). The communications module 910 is configured to send the communication output signal 910-NO to the communications device 821. The communications device 821 is configured to process, analyze, and/or respond to the communication output signal 910-NO. The communications device 821 is configured to generate a network output signal 921-NO based on the communication output signal 910-NO and/or the processing of the communication output signal 910-NO. The communications device 821 is configured to send the network output signal 921-NO to the network 825 through the internet 822, a direct connection between the network 825 and the communications device 821, and/or the like. The network output signal 921-NO travels through the network 825 and communicates with and/or operates the database 820, other computing devices 810-D, and/or any other possible electronic devices (hereinafter "receptors"), including causing the receptors to connect, authenticate, verify user, receive and/or accept and/or store content (photos, audio, video, game parameters, vehicle specifications, and/or the like), transmit and/or send content, transform information, duplicate data, read records, delete records, save records, share location information, share vehicle location information, coordinate active gameplay, and/or the like. The receptors are configured to connect, authenticate, verify user, receive and/or accept and/or store content (photos, audio, video, game parameters, vehicle specifications, and/or the like), transmit and/or send content, transform information, duplicate data, read records, delete records, save records, share location information, share vehicle location information, coordinate active gameplay, and/or the like, based on the network output signal 921-NO.

The receptors are configured to generate a network input signal 921-NI to transmit and/or send data, information, content, location, game coordination data, and/or responses to the communications device 821 based on the network output signal 921-NO. In some embodiments, the receptors are configured to generate the network input signal 921-NI based on data, information, content, events and/or the like that are initiated from the receptors. The receptors are configured to send the network input signal 921-NI to the communications device 821. Generally, the network input signal 921-NI will be wrapped in headers, divided into packets, transformed to fit communication protocols, and/or the like, and need processing for use by the communications module 910 and/or the application system 815. The communications device 821 is configured to process the network input signal 921-NI and to generate the communication input signal 910-DI based on the network input signal 921-NI and/or the data, content, and/or information of the network input signal 921-NI. The communications input signal 910-DI is a signal that contains the content, data, response and/or information sent by the receptors in a format that can be processed, used, accepted, and/or understood by the communications module 910.

It will be apparent to those of ordinary skill in the art that in embodiments where the computing device 810 and/or communications device 821 have a location module, as disclosed above in the discussion of the location module in FIG. 8, the data, information, content, and/or signals coming into the communications device 821 (or into a separate location module), whether through the database 820, the internet 822, network 825, I/O device 840, and/or directly to the location module, may include the past or current physical and/or geological location of the computing device 810, the other computing devices 810-D, and the vehicle 700, as well as the physical and/or geological location associated with the content, data, information, and/or signals from I/O device 840 and/or from communications device 821.

Figure 10:
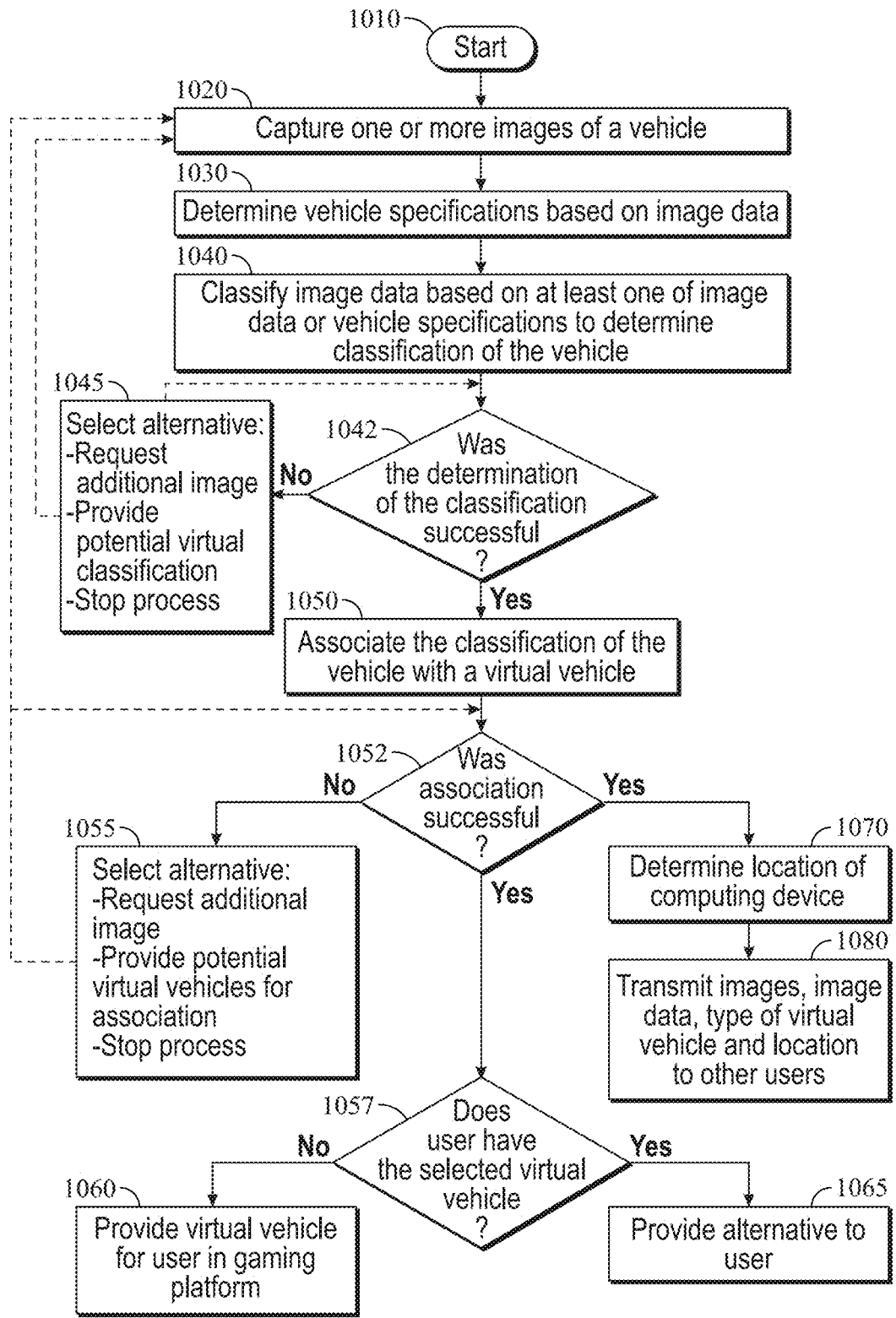
FIG. 10 illustrates a process for capturing vehicle images, determining a vehicle and vehicle or image classification, and associating the vehicle or classification with a virtual vehicle on a gaming platform.

FIG. 10 illustrates a gameplay process of the operation of a system, including systems 100 and 800, for capturing vehicle images, determining a vehicle and/or vehicle classification, and associating the vehicle and/or vehicle classification with a virtual vehicle on a gaming platform. The process starts at step 1010, where the system is in gameplay and is in a state for capturing content (one or more images, photos, sounds, videos, audio, and/or the like) of the environment including a vehicle, such as vehicle 700. Next, in step 1020, generally via a camera/imaging device 844 through the optical recognition module 904 and in response to an input command form a user 105 via a user interface 842, the process captures one or more images (or any other content, as has been discussed above) of a vehicle. The process transforms or processes the one or more images into image data, and/or generates image data based on the one or more images.

In step 1030, the process determines one or more vehicle specifications based on the one or more images and/or image data. Next, in step 1040, the process classifies the image data as at least one virtual vehicle based on at least one of the content of the image data and the vehicle specifications. In some embodiments, the process classifies the image data and determines the vehicle classification based on the image data classification. In some embodiments, the process classifies the image data and generates an image data classification that corresponds to a virtual vehicle.

In some situations, the image data cannot be classified, or the image data and/or the vehicle specifications cannot be generated or determined. For example, if a photo of a vehicle is taken in extreme low light, with blurred lenses, while moving or shaking the camera/imaging device 844 and/or the like, the photo (image data) will not have enough information, detail, and/or content for processing. Step 1042 addresses these issues. In step 1042, the process determines whether the determination of the vehicle classification and/or the classification of the image data, whether a virtual vehicle is associated with the image data, and/or whether the association of the image data with one virtual vehicle was successful. In some embodiments, the process in step 1042 determines whether the steps 1030 and/or 1040 were successful. If there was no success (as in the answer to the process in step 1042 is "No"), the process moves to step 1045. In step 1045, depending on the programming of a particular embodiment and/or the preferences of and/or selected parameters of the user 105, the process requests another image (moving back to step 1020), provides the user 105 potential image data classifications as a vehicle/virtual vehicle (once a vehicle/virtual vehicle is selected and the image data classified as the selection by the user 105, the image data is considered classified, moving the process back to step 1042 or to step 1050 (not shown)), or the process stops. If the process moves back to step 1042 after image data classification at step 1045, the process at step 1042 determines that there is success (as in the answer to the process in step 1042 is "Yes") and moves on to step 1050.

At step 1050, the process associates the classification of image data with the virtual vehicle that corresponds to such classification. In some embodiments, at step 1050, the process associates the image data with the virtual vehicle that corresponds to the classification of the image data. In some embodiments, at step 1050, the process associates the vehicle contained in the image data with the virtual vehicle that corresponds to the classification of the image data. In some embodiments, at step 1050, the process associates the vehicle contained in the image data with the virtual vehicle that corresponds to the classification of the vehicle contained in the image data.

Note that while a vehicle in the image data might be identified and/or classified, it might still be possible that a virtual vehicle is not available to the user (for example, the virtual vehicle is not programmed or does not exist, the user 105 needs to go through other tasks in the gameplay or needs credits, etc.). Step 1052 addresses these issues.

In step 1052, the process determines whether the association in the step 1050 was successful. If there was no success (as in the answer to the process in step 1052 is "No"), the process moves to step 1055. In step 1055, depending on the programming of a particular embodiment and/or the preferences of and/or selected parameters of the user 105, the process requests another image (moving back to step 1020), provides the user 105 potential virtual vehicles for association (once a virtual vehicle is selected by the user 105 and associated with the classification discussed at step 1050, the association is considered successful, moving the process back to step 1052), or the process stops. If the process moves back to step 1052 after the association at step 1055, the process at step 1052 determines that there is success (as in the answer to the process in step 1052 is "Yes") and moves on to steps 1057 (and if there is location/GPS functionality, also to step 1070, as illustrated in FIG. 10).

A successful association means that the vehicle (or the image data or any underlying classification of the vehicle, the image data, the content of the image data, the vehicle in the image data, and/or the like) is associated with a selected virtual vehicle. Note that the user 105, during gameplay or otherwise, may have already obtained or may already have access to the selected virtual vehicle. At step 1057, the process determines whether the user 105 has the selected virtual vehicle. If there is no (as in the answer to the process in step 1057 is "No"), the process moves to step 1060. At step 1060, the process provides or gives access to the user 105 of the selected virtual vehicle in the gaming platform. In other words, the user 105 can now use the selected virtual vehicle in the game. If there is yes (as in the answer to the process in step 1057 is "Yes"), the process moves to step 1065. At step 1065, the process provides a selected virtual vehicle alternative to the user 105. The selected virtual vehicle alternative may be credits, points, access to other virtual vehicles, additional customization options, opportunities to "level up," and/or the like, which may be random, imposed, or selected by the user 105. After step 1060, and in the applicable scenarios, after step 1065, the process stops (except for the steps 1070 and 1080, if applicable as discussed below). When the process stops, the user is directed back to another state of the game and/or to other sections or aspects of the gameplay.

As stated above, as the process goes through the path to step 1057, if there is location/GPS functionality, the process proceeds in parallel to step 1070. At step 1070, the process determines the location of the computing device 810. If the location is obtained, the process moves to step 1080, at which the process transmits the images, image data, type of virtual vehicle that was associated, and the location of the computing device 810 at the moment of capture of the image data (the location of the computing device 810 at step 1020). The user 105 may or may not be informed of the process moving to steps 1070 and/or 1080, and the user 105 may or may not be given an opportunity to stop the process from moving to steps 1070 and/or 1080 through previously selected settings and/or game parameters, and/or through an immediate alert prior to proceeding to step 1070 and/or 1080. Once step 1080 is performed, the process stops as to this location/transmission leg, but continues with the steps on and after step 1057 if applicable.

It will be readily apparent to those of ordinary skill in the art that the connections and the inputs and outputs between devices and modules discussed above, while shown in FIG. 9 and discussed as directly occurring between devices and modules, they are processed, ordered, caused, operated, and/or coordinated by the processor 811 executing the application system 815. FIG. 9 shows various connections, inputs, and outputs occurring between devices or between devices and modules (and, as application system 815 resides in memory 812, therefore, occurring between devices and memory 812). However, in some embodiments, one or more of the connections, inputs, and/or outputs illustrated in FIG. 9 are sent, received, processed, implemented, and/or occur through or via the processor 811 and/or other intermediary electronics.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

An equivalent substitution of two or more elements can be made for any one of the elements in the claims below or that a single element can be substituted for two or more elements in a claim. Although elements can be described above as acting in certain combinations and even initially claimed as such, it is to be expressly understood that one or more elements from a claimed combination can in some cases be excised from the combination and that the claimed combination can be directed to a subcombination or variation of a subcombination.

It will be appreciated by persons skilled in the art that the present embodiment is not limited to what has been particularly shown and described hereinabove. A variety of modifications and variations are possible in light of the above teachings without departing from the following claims.

What is claimed is:

1. A system for determining a vehicle and associating the vehicle with a virtual vehicle on a gaming platform, the system comprising:
   a computing device including a camera configured to capture one or more images of a vehicle, the one or more images having image data, wherein the image data comprises at least one of audio data, video data, and still image data;
   an optical recognition module configured to determine a plurality of vehicle specifications based on the image data of the vehicle;
   a classification module configured to determine a classification of the vehicle via classifying the image data based on at least one of the image data and the plurality of vehicle specifications, the classification module further configured to associate the classification of the vehicle with a first virtual vehicle on a gaming platform provided by a gaming module;
   a communications module configured to enable communications between the plurality of users via a network, wherein the gaming module enables a plurality of users to compete via racing a plurality of virtual vehicles including the first virtual vehicle and a second virtual vehicle; and
   a location module configured to determine the location of the computing device and associate the location with at least one of the image data and the classification of the vehicle;
   wherein the communications module is further configured to transmit the location and the at least one of the image data and the classification of the vehicle to the plurality of users.

2. The system of claim 1, wherein each of the plurality of virtual vehicles has one or more virtual vehicle specifications that include at least one of a vehicle speed, a vehicle acceleration, a vehicle handling, and vehicle aesthetics; wherein the gaming module enables a plurality of users to compete via racing a plurality of virtual vehicles including the first virtual vehicle.

3. The system of claim 2, the system further comprising:
   a vehicle customization module configured to customize the one or more virtual vehicle specifications of the plurality of virtual vehicles.

4. The system of claim 3, wherein the vehicle aesthetics include interior and exterior vehicle aesthetics.

5. A non-transitory computer readable medium having computer readable instructions executable by a processor which, when executed, performs a process for determining a vehicle and associating the vehicle with a virtual vehicle on a gaming platform, the process comprising:
   capturing image data of a vehicle in an environment with a computing device comprising an image data capturing device;
   storing the image data and transmitting the image data to an optical recognition module configured to receive the image data of the vehicle;
   determining a plurality of vehicle specifications based on the image data;
   associating the plurality of vehicle specifications with a virtual vehicle on a gaming platform provided by a gaming module;
   corresponding the plurality of vehicle specification with the virtual vehicle;
   determining the outcome of an interaction between the virtual vehicle of one or more users;
   determining the location of the computing device;
   associating the location with at least one of the image data and a classification of the vehicle; and
   transmitting the location and the at least one of the image data and the classification of the vehicle to at least one of a plurality of users.

6. The non-transitory computer readable medium of claim 5, wherein the process further comprises:
   transmitting communications between at least two of the one or more users in a network.

7. The non-transitory computer readable medium of claim 5, wherein the process further comprises:
   changing the plurality of vehicle specifications based on vehicle customizations.

8. The non-transitory computer readable medium of claim 7, wherein the vehicle customizations include vehicle speed, vehicle acceleration, vehicle handling, and vehicle aesthetics, wherein the vehicle aesthetics comprise interior aesthetics and exterior aesthetics.

9. The non-transitory computer readable medium of claim 7, wherein the process further comprises:
   determining the classification of the vehicle via classifying the image data based on at least one of the image data and the plurality of vehicle specifications;
   wherein the associating the plurality of vehicle specifications with a virtual vehicle is based at least in part on the classification of the vehicle.

10. The non-transitory computer readable medium of claim 5, wherein the process further comprises:
    determining the classification of the vehicle via classifying the image data based on at least one of the image data and the plurality of vehicle specifications;
    wherein the associating the plurality of vehicle specifications with a virtual vehicle is based at least in part on the classification of the vehicle.

11. A process for determining a vehicle and associating the vehicle with a virtual vehicle on a gaming platform, the process comprising:
    capturing image data of a vehicle in an environment with a computing device comprising an image data capturing device;
    storing the image data and transmitting the image data to an application system configured to receive the image data of the vehicle;
    determining a plurality of vehicle specifications;
    associating the vehicle with a virtual vehicle on a gaming platform provided by a gaming module;
    corresponding the plurality of vehicle specifications with the virtual vehicle;
    determining the outcome of an interaction between the virtual vehicle of one or more users;
    determining the location of the computing device;

associating the location with at least one of the image data and a classification of the vehicle; and transmitting the location and the at least one of the image data and the classification of the vehicle to at least one of a plurality of users.

12. The process of claim 11, wherein the process further comprises:

transmitting communications between at least two of the one or more users in a network.

13. The process of claim 11, wherein the process further comprises:

changing the plurality of vehicle specifications based on vehicle customizations.

14. The process of claim 13, wherein the vehicle customizations include vehicle speed, vehicle acceleration, vehicle handling, and vehicle aesthetics, wherein the vehicle aesthetics comprise interior aesthetics and exterior aesthetics.

15. The process of claim 14, wherein the process further comprises:

determining the classification of the vehicle via classifying the image data based on at least one of the image data and the plurality of vehicle specifications;

wherein the associating the plurality of vehicle specifications with a virtual vehicle is based at least in part on the classification of the vehicle.

16. The process of claim 11, wherein the process further comprises:

determining the classification of the vehicle via classifying the image data based on at least one of the image data and the plurality of vehicle specifications;

wherein the associating the plurality of vehicle specifications with a virtual vehicle is based at least in part on the classification of the vehicle.

* * * * *